Feb. 5, 1952  J. O. FORSTER  2,584,118
TOOL FOR INSERTING SCREW THREAD LININGS
Filed May 27, 1950

INVENTOR.
John O. Forster
BY Walter S. Pleston

ATTORNEY.

Patented Feb. 5, 1952

2,584,118

UNITED STATES PATENT OFFICE 2,584,118

TOOL FOR INSERTING SCREW THREAD LININGS

John O. Forster, Long Island City, N. Y., assignor to Heli-Coil Corporation, Queens County, N. Y., a corporation of Delaware Application May 27, 1950, Serial No. 164,779

7 Claims. (Cl. 10—1)

1

The invention relates to a tool for inserting, into an interiorly threaded member, a screw thread lining which consists of a wire coil, provided with a tang for the application of an inserting tool. A tool of the type here under consideration has been described in my co-pending application, Serial No. 709,554 filed November 13, 1946, on which Letters Patent No. 2,513,792 has been granted on July 4, 1950, and according to which the tool essentially comprises a mandrel rotatable in a sleeve and projecting therefrom with both its ends. The one end of the mandrel is provided with an axial slot to receive therein the tang of the coil to which the mandrel may be applied from the inside thereof, and the end of the sleeve adjacent the slot is provided with an interior taper against which the tangless end of the coil can bear, while the mandrel is prevented from shifting axially with respect to the sleeve. The mandrel of the tool according to the mentioned application has several predetermined positions in axial relationship with respect to the sleeve in order to adapt it to coils of different lengths.

The present invention aims to improve the mentioned type tool and to render it useful for inserting a coil to an accurately adjusted depth from the surface of the member the interior threading of which is to be lined.

Another object of the invention is the provision of means releasably attachable to a tool of the mentioned type for facilitating the contraction of a coil during its insertion.

Figure 3:
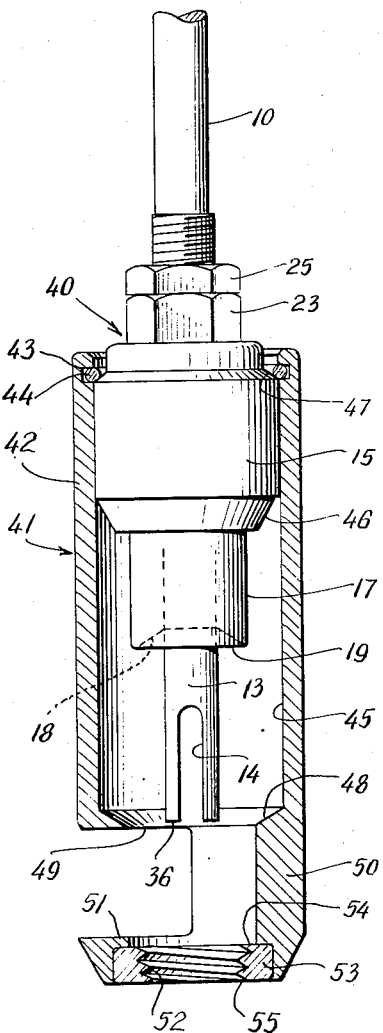

Further objects and details of the invention will be apparent from the description given hereinafter and the accompanying drawing illustrating an embodiment thereof by way of example. In the drawing Fig. 1 is a longitudinal cross-section of a tool according to the invention as applied to a wire coil during its insertion into an interiorly threaded member, Fig. 2 is a modified portion of the tool, and Fig. 3 is a side elevation of the tool of Fig. 1 with an attachment for contracting a coil prior to and during its insertion, shown in a longitudinal cross-section.

Figure 1:
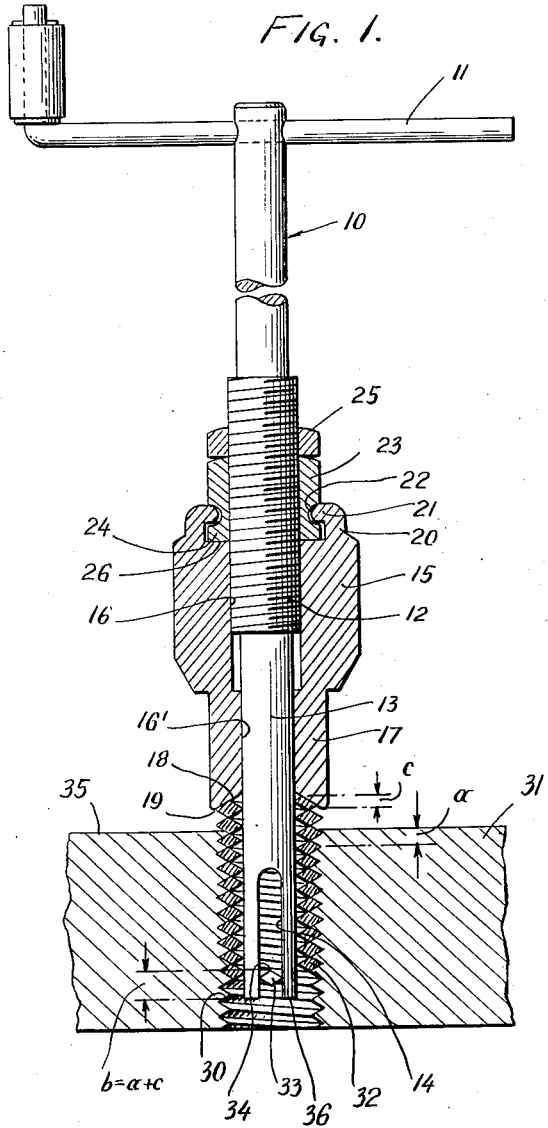
Figure 2:
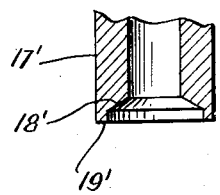

Referring now to the drawing, the tool illustrated in Fig. 1 comprises a mandrel in general denoted by 10. The upper end of the mandrel is adapted by any suitable means as e. g. a cross-bar 11 for the application of a torque thereto. A median portion 12 is exteriorly screw threaded, and the other end portion 13 which is of an outer diameter not exceeding the

2 inner diameter of a coil to be inserted with the aid of the tool, is provided with an axial slot 14 of substantial length. The mandrel is freely rotatable in a sleeve body 15, the inner surface 16 of which is cylindrical and of a diameter similar to the outer diameter of the mandrel threading 12. The lower portion 17 of the sleeve may be of a reduced diameter and has an inner surface 16' which guides the mandrel portion 13. It is provided with an inner taper 18 which may extend from the outer circumferential surface of the sleeve portion 17 to its inner surface 16'. However, for a reason to be explained hereinafter, it is advisable to avoid a sharp edge where the outer surface and the taper meet and to provide for at least a narrow rounded or plane ring zone 19 which may or may not project axially from the taper, as the ring zone 19' projects in Fig. 2 from the taper 18' of the sleeve end 17'. The other end of the sleeve forms an axially extending rim 20 continued in an inwardly projecting flange 21. This flange engages in a peripheral groove 22 of a nut 23 which is screwed on the thread 12 of the mandrel 10 and bears with its lower end portion 24 on the top face 26 of the sleeve surrounded by the rim 20. In the production, the flange 21 may originally be an axially extending portion of the rim 20, to be turned inwardly into the groove 22 by a suitable operation, e. g. by rolling. Whereas the upper portion of nut 23 may have any desired cross-sectional shape suited to form a safe grip, the lower portion 24 and the groove 22 have circular contours. Consequently the nut 23 is fixed to the sleeve against relative movement in an axial direction but can readily turn in relation thereto. Means such as the stop nut 25 are provided to secure the nut on the mandrel in any adjusted position.

When the interior thread 30 of a member 31 is to be lined with a wire coil 32 having a tang 33, first the coil is slid over the mandrel end so that the tang 33 engages in the slot 14 and the opposite end of the coil bears against the tapering face 18. The slot 14 should be of such a length that the tang is freely movable therein in an axial direction without ever abutting against the bottom of the slot. This is necessary to prevent an undesirable bending of the tang during the insertion of the coil. By turning the nut 23 relatively to the mandrel, the latter will be adjusted relatively to the sleeve according to the desired depth to which the coil is to be inserted below the surface 35 of the threaded member 31. If it is desired, that finally the upper end face of the coil is below the surface 35, e. g. a distance $a$, then, correct adjustment is attained, when the distance $b$ of the inner edge 34 of the tang 33 from the end face 36 of the mandrel is equal to the distance $a$ plus the distance $c$ which is that of the upper end face of the coil from the edge or ring zone 19 of the sleeve. By tightening the stop nut 25 on nut 23 the latter will be secured in its adjusted position with the result that the mandrel together with the nuts thereon as an entirety can be turned within the sleeve without any axial shift of the parts relatively to one another. Now, the coil can be applied to the threading 30 from the side of the surface 35. For this purpose the sleeve is to be held non-rotating and slightly pressed down while the mandrel is turned to screw the coil home. The pressure has the twofold effect, first to cause the tang-provided end convolution of the coil to enter into the thread 30 of the member, and second to cause some friction between the opposite end convolution of the coil and the tapered face 18 of the sleeve. This friction will tend to contrast the coil when the mandrel is turned and thereby facilitate the screwing-in of the coil.

The contact between the coil end and the taper will be maintained until the coil is screwed into the thread so deep that the edge or ring zone 19 abuts against the surface 35 of member 31. As it has been mentioned hereinbefore, a ring zone 19 is preferred to a sharp edge in order to avoid damage to the surface 35 if by inadvertance an excessive pressure is applied to the sleeve. When, then, the turning of the mandrel is continued, the tool cannot be advanced any more in an axial direction while the coil proceeds on its path prescribed by the thread 30. In consequence, the tang 33 will move downward within the slot 14 of the mandrel until it is entirely free from the latter, and further turning of the mandrel does not affect any more the coil which, according to the setting of the tool, thus has reached its desired position and depth within the thread 30.

Now, I have found, that in certain instances, particularly if the coil is over-sized in its diameter in relation to the diameter of the thread 30, a very considerable pressure, more than desirable, must be applied to the sleeve during the insertion of the coil in order to set up that amount of friction which would be necessary to contract the coil sufficiently. For such a contingency, the invention further provides a removable attachment to the described tool. Such attachment may be based on the principle of a tool disclosed in U. S. Patent 2,316,231 of April 13, 1943, and conventionally denoted as a prewinder tool. In the illustrated embodiment of Fig. 3, there is a tool according to Fig. 1 and in general denoted by 40, comprising the mandrel 10 with its slot 14 and nuts 23 and 25 in engagement with the mandrel thread 12 and secured against axial movement to the sleeve body 15 the diametrically reduced end portion 17 of which is provided with the interior end taper 18. The attachment in general denoted by 41 comprises a hollow cylindrical portion 42 of an inner diameter corresponding to the outer diameter of the sleeve body 15 and of considerably greater length than the latter which is freely rotatable and axially shiftable in portion 42. Any suitable and conventional means may be used to connect the attachment 41 detachably to the tool 40 so that the mentioned relative movability of the one in relation to the other is insured. However, it is desirable that no external means are required to accomplish the attaching and detaching operations. For this purpose, the upper end of the portion 42 is provided with an interior peripheral groove 43 having a spring ring 44 embedded therein which slightly projects beyond the inner cylindrical surface of the portion 42. Sleeve body 15 is provided with a tapering face zone 46 where it is joined with the reduced portion 17, and with another tapering face zone 47 near its other end. When pushing the attachment 41 on the sleeve body 15, the taper 46 will expand the ring 44 which can contract to its original diameter when it passes the taper 47. The latter acts in a similar way on the ring when the attachment is to be removed from the tool 40. It will be noticed that the taper 46 is steeper than the taper 47. In consequence, only a small force is required to attach part 41 to 40, whereas a very appreciable force is needed to separate the parts from each other. This is desirable in order to avoid their separation if during the use the part 40 is rapidly pulled upwards in relation to part 41.

Portion 42 has an interior bottom shoulder 48 which may be beveled as shown and which has an opening 49 of a diameter corresponding to the sleeve portion 17 so that the latter can be projected therethrough. The wall of portion 42 is extended beyond that shoulder 48, and this extension 50 ends in a foot 51 opposite to and spaced from the opening 49. Extension 50 is semi-circular in cross-section and of an inner diameter corresponding to the opening 49 and its length is such that there is sufficient space between shoulder 48 and the foot 51 for the insertion of the longest coil for which the tool is destined. The foot is provided with an inner thread 52 coaxial with the tubular portion 42 and of a pitch according to that of a coil to be inserted with the aid of the tool. The thread tapers from a diameter corresponding to the outer diameter of a coil in its free state to a diameter to which it is intended to contract that coil. It may be provided within the foot material proper or, preferably, in a separate piece 53 which is pressed and secured in the foot. In any event, a shoulder 54 is formed adjacent the thread 52 where it is widest, against which shoulder the sleeve portion 17 can abut with its ring zone 19 when the part 40 is shifted with respect to part 41 in the direction of foot 51.

In order to adjust the tool for inserting a coil to a desired depth under the surface from which the thread to be lined extends into a member, part 40 will be shifted in relation to part 41 so that zone 19 abuts against shoulder 54 and the slotted mandrel end projects through the foot 51 and beyond its bottom surface 55. By turning nut 23 on the mandrel after nut 25 has been loosened, and while the parts 40 and 41 are in the mentioned relative position, the distance of the face 36 of the projected mandrel end from the bottom face 55 will be so adjusted that it is equal to the total length of the coil to be inserted plus the desired depth of the coil under the surface of the member the thread of which is to be lined, minus the thickness of the coil wire.

When the tool is so set, part 40 will be retracted to its position of Fig. 3 whereupon a wire coil may be placed with its tanged end on shoulder 54 between the foot 51 and shoulder 48. By projecting part 40 the tang of the coil can be brought into engagement with the mandrel slot so that the sleeve taper 18 bears on the opposite coil end. Holding part 41 stationary and turning the mandrel in the proper direction will screw the coil into the thread 52, simultaneously contracting its leading portion owing to the taper of the thread. It is immaterial whether during the turning of the mandrel in relation to the part 41 the sleeve turns with the mandrel or whether the mandrel turns in the sleeve. When the leading coil end in its contracted state starts to project from the lower foot face 55 the tool with the coil will be brought into registry with the threaded hole to be lined, face 55 bearing on the surface of the member provided with that threaded hole. Continued turning of the mandrel will, then, screw the coil in. When in the course of this operation, face 19 reaches shoulder 54, the tang will start to slide out of the mandrel slot as hereinbefore described and will be free when the coil is in its desired position, whereupon the tool can be withdrawn.

It will be apparent to those skilled in the art that many alterations and modifications of the illustrated structure are possible without departure from the essence and spirit of my invention which for that reason shall not be limited but by the scope of the appended claims.

I claim:

1. A tool of the type described comprising a mandrel having one end axially slotted, its other end formed for the application of a torque, and an intermediate threaded portion, a sleeve surrounding said mandrel intermediate its ends and having the one of its end faces from which said slotted mandrel end projects inwardly tapered, said mandrel being freely rotatable in said sleeve, and a nut in engagement with said mandrel thread, said nut and said sleeve including peripherally interengaging portions whereby said nut is held to said sleeve in the axial direction but free to rotate with said mandrel relatively to said sleeve.

2. A tool of the type described comprising a mandrel having one longitudinally slotted end portion, a screw threaded median portion, and another end portion adapted for the application of a torque, a nut adjustably engaging said mandrel thread, means to secure said nut to said mandrel in an adjusted position, a sleeve with an interior cylindrical bore surrounding said mandrel intermediate its ends, said mandrel being axially shiftable and freely rotatable in relation to said sleeve, the sleeve end face adjacent said slotted mandrel end including a portion tapering towards the other sleeve end, and means in connection with said other sleeve end and said nut to secure said nut to said sleeve against relative axial movement but with freedom to rotate with said mandrel relatively to said sleeve.

3. A tool as claimed in claim 2 wherein said cylindrical bore of said sleeve includes a first portion of a diameter corresponding to the outer diameter of said threaded mandrel portion which is freely movable therein axially and peripherally, and a second portion of a diameter corresponding to that of said slotted mandrel portion which is guided therein.

4. A tool as claimed in claim 2, said nut being provided with a peripheral groove in its portion adjacent said sleeve, and the sleeve and adjacent said nut including an axially projecting rim surrounding said nut portion and having its end turned into said groove of said nut.

5. A tool as claimed in claim 1 further comprising a prewinder device and means to attach said device releasably to said sleeve, said device comprising a cylinder surrounding said sleeve so as to permit axial and peripheral movement of said sleeve within said cylinder, said cylinder including a bottom provided with an opening through which the slotted mandrel end and the adjacent end portion of said sleeve can be projected, and a foot part connected to said cylinder at a distance from said cylinder bottom, said foot part being provided with an interior tapering thread co-axial with said cylinder and having its widest end on the side facing said cylinder bottom, and said foot also having an abutment face surrounding said widest end of said tapering thread to be engaged by the end face of said sleeve when the latter is shifted in said cylinder so as to project from said bottom.

6. A tool as claimed in claim 5, said means for attaching said device comprising an open end of said cylinder opposite said bottom and provided with an interior peripheral groove, a spring ring within said groove so as to project peripherally from said groove beyond the inner face of said cylinder, and oppositely directed and spaced frustro conical portions of said sleeve, adapted to expand said spring ring when engaging it upon axial shifts of said cylinder in relation to said sleeve.

7. A tool as claimed in claim 5, further comprising a piece inserted into a bore of said foot and secured to the latter, said piece being provided with said tapering thread and said abutment face.

JOHN O. FORSTER.

REFERENCES CITED

The following references are of record in the file of this patent:

UNITED STATES PATENTS

| Number | Name | Date |
| --- | --- | --- |
| 1,418,298 | Gorman | June 6, 1922 |
| 2,050,702 | Jackson | Aug. 11, 1936 |
| 2,316,231 | Evan | Apr. 13, 1943 |
| 2,513,792 | Forster | July 4, 1950 |